United States Patent [19]

Baker et al.

[11] 3,727,039

[45] Apr. 10, 1973

[54] SINGLE SELECT LINE STORAGE SYSTEM ADDRESS CHECK

[75] Inventors: Floyd A. Baker, Apalachin; Wayne R. Sitler, Endwell, both of N.Y.

[73] Assignee: International Business Machines Corporation, Armonk, N.Y.

[22] Filed: Aug. 2, 1971

[21] Appl. No.: 168,302

[52] U.S. Cl. ....................................235/153 AM 235/153 AC; 340/174 ED

[51] Int. Cl. ....................................G11c 29/00

[58] Field of Search ....................340/174 ED; 235/153

[56] References Cited

UNITED STATES PATENTS

| | | | |
|---|---|---|---|
| 3,351,905 | 11/1967 | Kramer | 235/153 X |
| 3,420,991 | 1/1969 | Ling | 235/153 |
| 3,618,030 | 11/1971 | Creasy | 340/172.5 |

OTHER PUBLICATIONS

Bishop, D. A., Status Checking of a Computer System in IBM Tech. Disc. Bull. 13(3): p. 822. Aug. p. 822. Aug. 1970. TK 7800. 113.

*Primary Examiner*—Malcolm A. Morrison
*Assistant Examiner*—R. Stephen Dildine, Jr.
*Attorney*—George E. Clark et al.

[57] ABSTRACT

A method is disclosed for detecting address line failures employing a series of three tests. A first test is performed to determine whether a first group of address bit lines have failed resulting in an indication of an access to a location beyond the limits of the storage system. A second series of tests is performed to determine whether any address line has become short-circuited so as to always indicate a logic 1 resulting in an error indication. A third series of tests is performed to determine whether any address line is opened resulting in the continual presence of a logic 0. The tests are performed sequentially on all address lines accessing the storage system up to and including the last address to be tested in the system.

4 Claims, 3 Drawing Figures

INVENTORS
FLOYD A. BAKER
WAYNE R. SITLER

BY G.E. Clark

ATTORNEY

SINGLE SELECT LINE STORAGE SYSTEM ADDRESS CHECK

BACKGROUND OF THE INVENTION

The present invention relates to testing of digital storage systems for use with data processing systems and more particularly to the testing of digital storage systems which are accessed by a single select line for each address.

In the prior art, the most common digital storage system used with data processing systems is the magnetic core storage which requires a two-line select system. Usually, an X and a Y line identifies an address at a particular intersection. In such a system, if for example an X address line became shorted or open, the particular line could be identified rather easily by performing a series of tests on the Y address lines to determine which X addresses have a common failure thus identifying a particular X address line as being either opened or shorted.

The techniques employed in testing double select line memories cannot be used in testing for address line failures in a single select line storage system since there is no second address line to access a particular location in storage for the purpose of testing for address line failures.

Therefore, it is an object of the present invention to detect and locate address line failures in a single select line storage system.

It is a further object of the present invention to detect and locate address line failures in a single select line storage system using a series of tests to distinguish between address line failures and data bit failures.

SUMMARY OF THE INVENTION

Therefore, a preferred embodiment of apparatus and method according to the present invention employs a processing unit, such as is disclosed in copending application Ser. No. 29,227 entitled Destination Look Ahead, filed Apr. 16, 1970, lissued as U.S. Pat. No. 3,651,476 on Mar. 21, 1972 in which a single line select storage system including a main store portion and a control store portion operates under the control of a local store unit, a group of external registers and a memory address register to detect and identify single line address failures in either the control store portion or the main store portion of the storage system. The tests are divided into three portions. A first test determines whether there is any failure in the form of a shorted line on a group of high order address bits which would indicate an access beyond the limits of the storage system.

A second test identifies any low order address bits which may be shorted, thus giving an erroneous indication of logical 1, by storing all 0's in each location and checking for any erroneous logical 1's which may be read back.

A third test which is the inverse of the second test stores logical 1's in all locations and checks for any logical 0's which may be returned due to an open address line.

Data bus checks are performed throughout the series of address tests to clearly identify an error as an address line failure rather than a data bit failure.

The series of tests performed according to the method of the present invention on apparatus as described in the referenced copending application, enable addressing line failures to be detected and subsequently corrected before any error checking logic associated with the storage system has been verified as operating properly. The method of the present invention disables error checking logic and operates the storage system as a device under test under the control of a local storage unit in the processor.

The foregoing and other objects, features and advantages of the invention will be apparent from the following more particular description of a preferred embodiment of the invention, as illustrated in the accompanying drawing.

DESCRIPTION OF A PREFERRED EMBODIMENT

The preferred embodiment of the present invention will now be described with reference to the processor environment more completely described in U.S. Pat. No. 3,651,476 referenced above.

Figure 1:
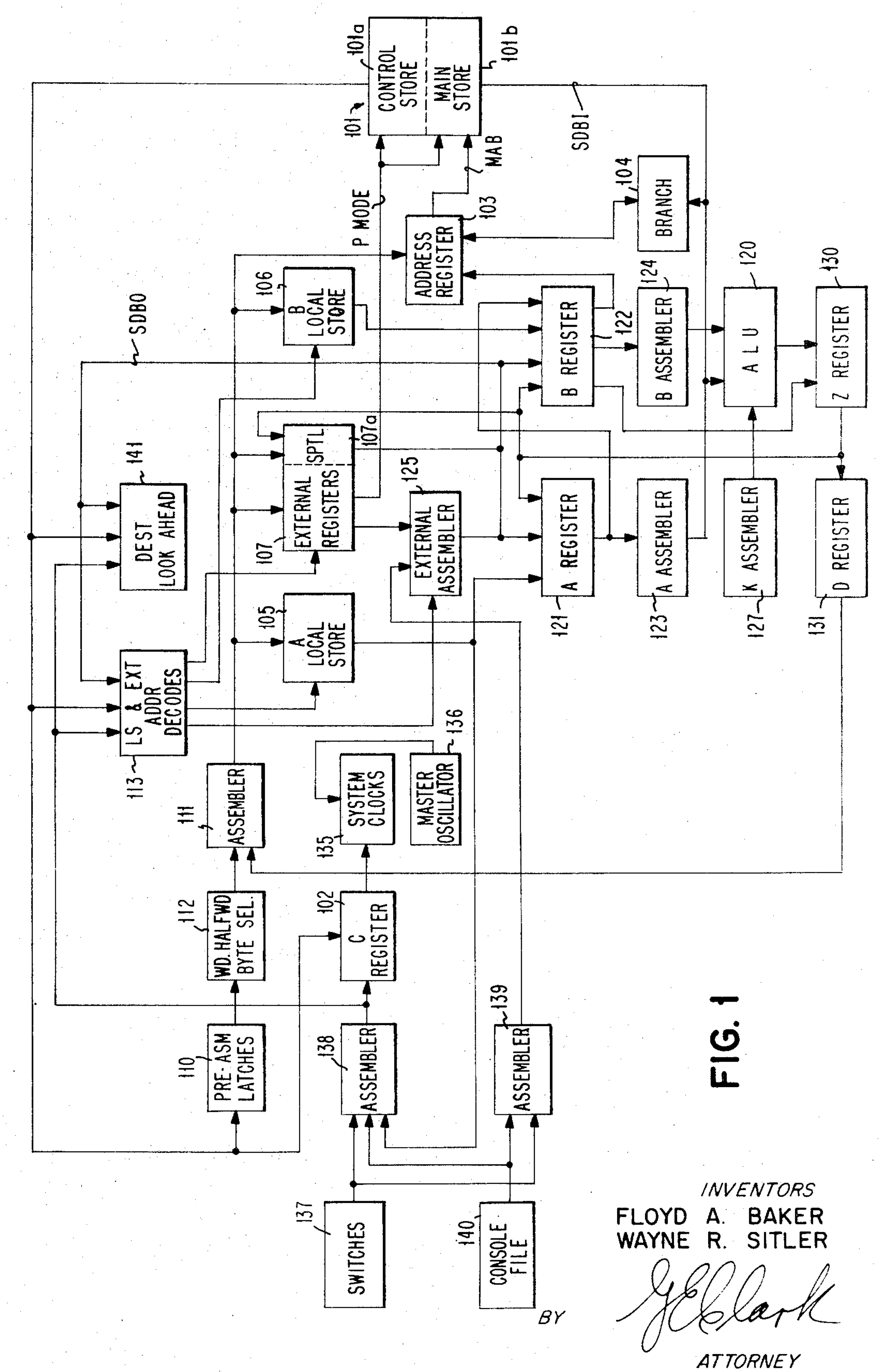
FIG. 1 is a schematic block diagram illustration of a processor of the type on which the method of the present invention may be performed.

Referring now to FIG. 1, it is seen that FIG. 1 of the instant application is identical with FIG. 1 of the referenced copending application with the exception of the addition of the "P MODE" line from external registers 107 to storage system 101. As is indicated in the flow chart of FIG. 3, when a test for address line failures is to be performed, the first step in the method is to set the "P MODE" on to disable all error checking logic and to have the storage system operate as a "-device under test."

During the operation of the address line tests, local storage A 105 and local storage B 106 control the operation of the processor and the storage system under test.

After the storage address test routine has been initiated, and the parity mode set to the "ON" condition, each location in the storage system under test has its address stored therein. Thus, address 00 now contains as data 00, address 01 now contains as data 01 etc. Each location contains as data its own address.

Figure 2:
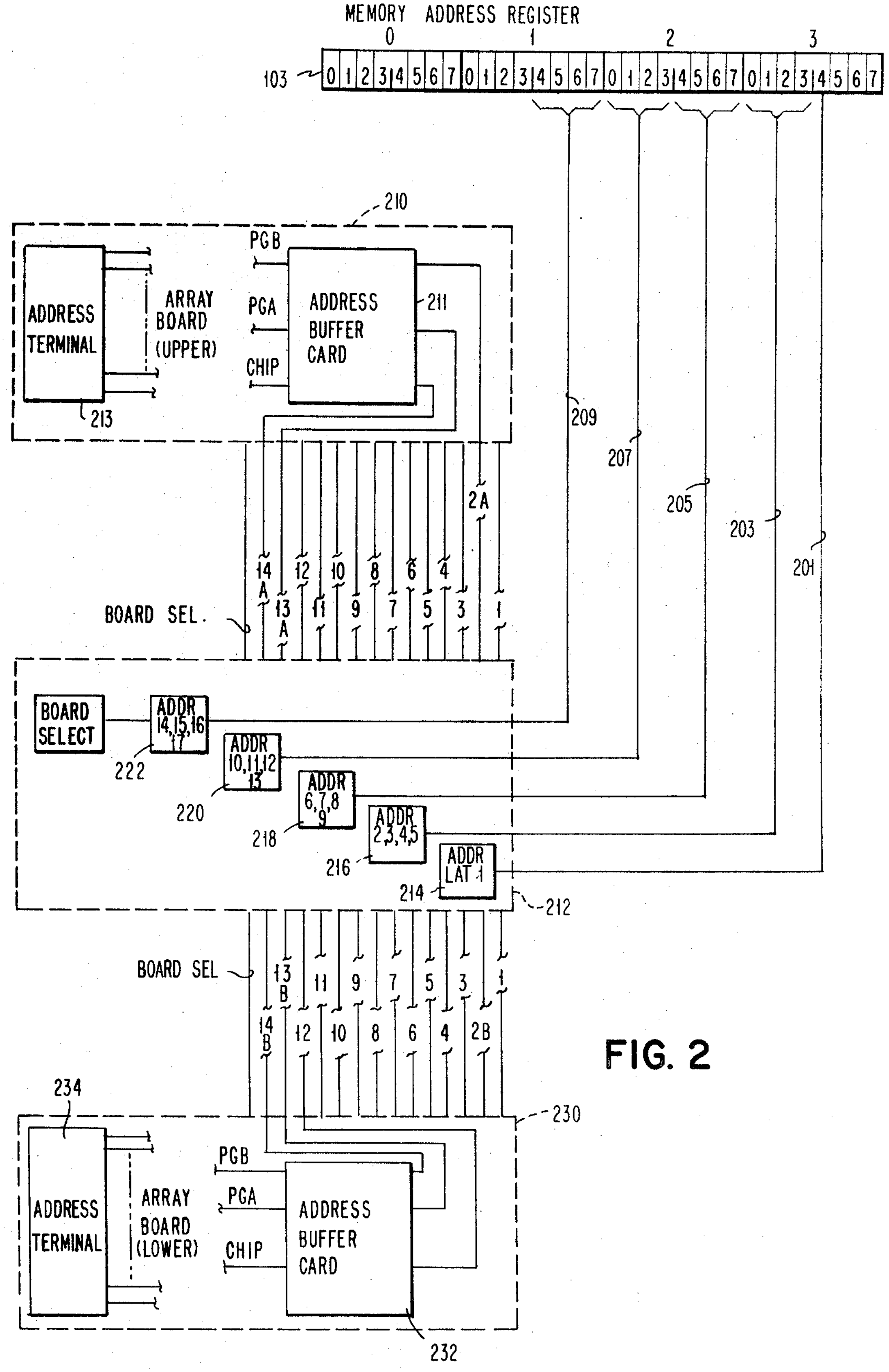
FIG. 2 is a schematic representation showing correspondence between memory address register and storage card addressing lines.

The data is next read out of a first location in the storage system under test to provide a check on address bits 14, 15, 16 and 17 (see FIG. 2). The nature of the storage system under test, as described in the above referenced copending application, is to present all ones on the storage data bus out lines when there has been an address failure on address bits 14 through 17 inclusive.

Referring now to FIG. 2, the connections between Memory Address Register Bus 103 and Board Select Logic 212 are shown.

Memory Address Register byte 3 bit 4 corresponds to address bit 1 and is connected to Address Latch 214.

Similarly MAR byte 3 bit 3 corresponds to address bit 2 and is connected to Address Latch 216.

The remaining address bits 3–17 correspond to MAR byte 3 bit 2 through byte 1 bit 4.

The connections are made between MAR bus 103 and Address Latches 214, 216, 218, 220 and 222 by bus lines 201, 203, 205, 207 and 209 respectively.

Figure 3:
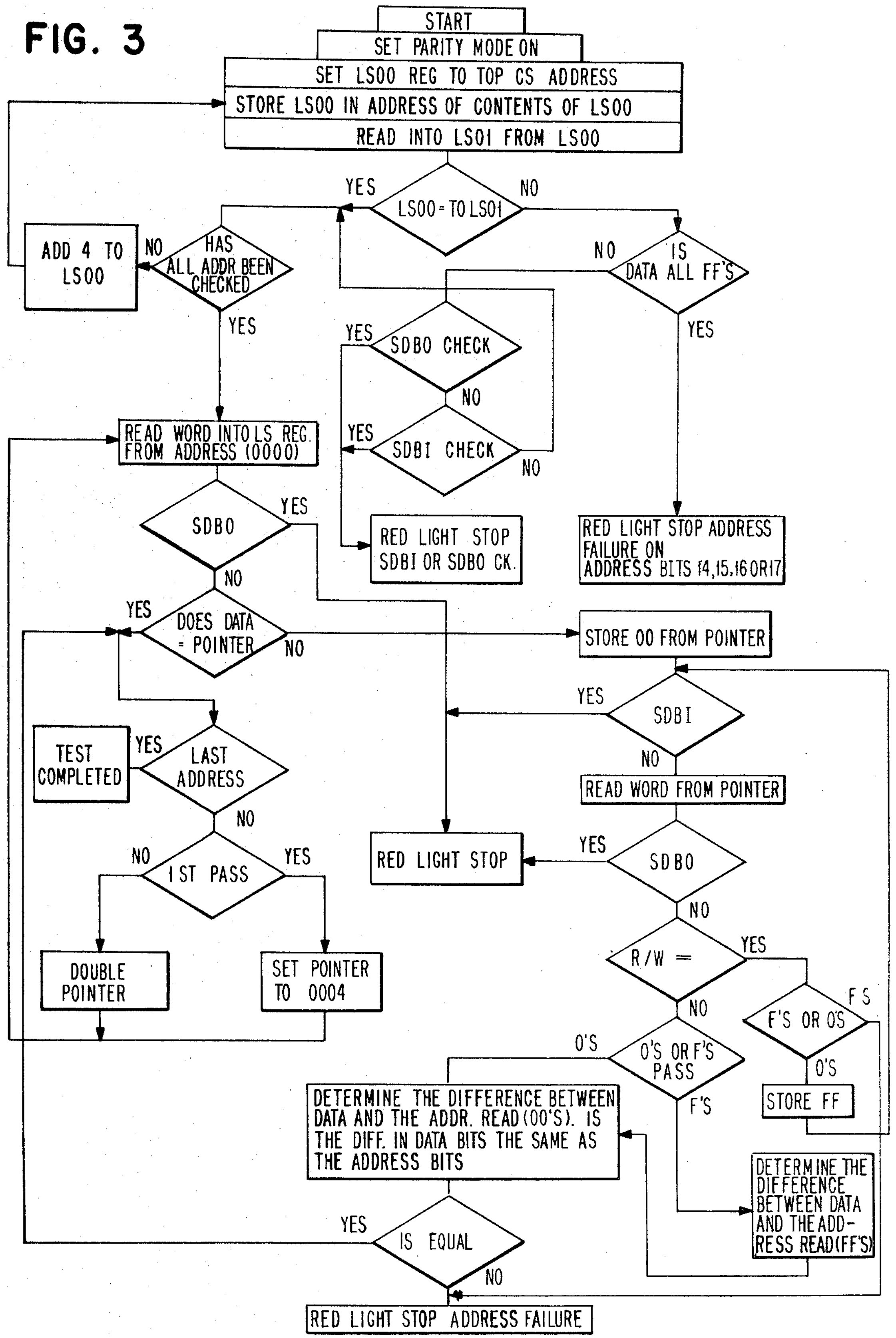
FIG. 3 is a logical flow chart which outlines the steps of the method of the present invention.

Now referring to FIG. 3, it can be seen that after the comparison is made to determine whether the data is all ones (FF), if the comparison is yes an address failure is indicated.

If the comparison is no, the test proceeds with the local store being incremented to address the next location in storage.

After all addresses have been checked for this first type of address line failure, the decision block labelled "has all addresses been checked" indicates yes allowing the next sequence of tests to be performed.

The data from address 00 is read out of the storage system and a check performed on the Storage Data Bus Out (SDBO). If the SDBO check indicates a failure, an immediate stop is performed indicating a data failure.

If no error is indicated on the Storage Data Bus Out check, a compare is made to determine whether the data read equals the "pointer." The "pointer" is the address indicated for the location from which the data is being read. If there is a valid compare which means that the data equals the pointer, then there is no address failure on the address line for that particular location.

The next step is to determine whether the address last checked is the last address in the storage system under test to be tested. If so, the test is then complete. If not, a determination is made as to whether a particular test is the first pass. If it is the first pass, the pointer is set to 0004 and the word contained in that location (0004) is read into local storage registers (105, 106).

If the test is not the first pass, the pointer is doubled and again a data word is read from the new pointer location into local storage registers (105, 106).

If as a result of the comparison between the data and the pointer, a no compare condition is indicated, all zero's are stored in the location address represented by the data retrieved.

For example, if the data retrieved is 010 when the pointer was 000, the next step would be to store all zero's in address 010.

A Storage Data Bus In (SDBI) check is performed to insure that no errors occur in the transmission of data between units of the system. The pointer is then accessed to read the word stored in the pointer. The Storage Data Bus Out (SDBO) check is again performed to insure that no data errors occur in transmission.

If no SDBO checks occur, a compare is made to determine whether the data read from pointer equals the data written into the location represented by pointer. If the read data equals the written data, since all zero's were stored initially, the next step is to store all one's (FF) and repeat the steps of reading from the pointer and comparing the read data with the written data. This process enables a comparison to be made to determine whether errors which occur are due to picked bits which would be detected on an all zero's pass and missing bits or "dropped" bits which would be detected on an all one's pass.

If a no equal compare is achieved on an all one's pass, a determination is made of a difference between the data and the address read. A comparison is then made to determine if the difference in the address bits is the same as the data bits. If an equality is achieved in this comparison, a check is made to determine whether the address under test is the last address as described above.

If no comparison is achieved in the determination of the difference between the data bits and the address bits, an address failure is indicated.

Thus it can be seen that the sequence of tests performed as outlined above provide a complete check which will enable detection and identification of address line failures in a single select line storage system.

While the invention has been particularly shown and described with reference to a preferred embodiment thereof, it will be understood by those skilled in the art that various changes in form and details may be made therein without departing from the spirit and scope of the invention.

What is claimed is:

1. A method of detecting address line failures in a single select line storage system comprising the steps of:
   - storing in each storage location data representative of an address for said location;
   - reading from each location the data stored in said location;
   - comparing data stored in each said location with data read from each said location to determine if a data pattern indicating an access beyond the limits of said system has been received;
   - second testing for short-circuited address lines by storing an all zero's data pattern to detect any erroneous one bits;
   - third testing for open-circuited address lines by storing all one's data to detect any erroneous zero bits.

2. A method according to claim 1 wherein said step of second testing comprises:
   - storing in each storage location data representative of an all zero's pattern;
   - reading data from each storage location;
   - comparing said data read to determine if any one bits are present;
   - indicating an error on the address line for the storage location which indicated a one bit present.

3. A method according to claim 2 wherein said step of third testing comprises:
   - storing all one's data in each storage location;
   - reading data from each storage location;
   - comparing said data read from each storage location to determine if any zero bits, indicating a dropped bit, are present;
   - indicating an error on the address line for the storage location at which the dropped bit was indicated.

4. A method according to claim 1 further comprising the steps of:
   - disabling any error checking circuitry responsive to errors in said storage system to prevent erroneous error indication due to unverified error checking circuits.

* * * * *